United States Patent [19]

Griffin et al.

[11] Patent Number: 4,638,482
[45] Date of Patent: Jan. 20, 1987

[54] RANDOM LOGIC ERROR DETECTING SYSTEM FOR DIFFERENTIAL LOGIC NETWORKS

[75] Inventors: William R. Griffin, Shelburne, Vt.; Lawrence G. Heller, Boca Raton, Fla.; Peter N. Horowitz, Essex Junction, Vt.

[73] Assignee: International Business Machines Corporation, Armonk, N.Y.

[21] Appl. No.: 685,880

[22] Filed: Dec. 24, 1984

[51] Int. Cl.⁴ .............................. G01R 31/28
[52] U.S. Cl. ........................... 371/63; 371/57
[58] Field of Search ..................... 371/63, 57

[56] References Cited

U.S. PATENT DOCUMENTS

| | | | |
|---|---|---|---|
| 3,559,167 | 1/1971 | Carter et al. | 371/63 |
| 3,602,886 | 8/1971 | Carter et al. | 371/63 |
| 3,634,665 | 1/1972 | Carter et al. | 371/63 |
| 3,636,443 | 1/1972 | Singh et al. | 324/73 R |
| 3,803,568 | 4/1974 | Higashide | 340/213 R |
| 3,825,894 | 7/1974 | Johnson, Jr. | 371/63 |
| 3,838,393 | 9/1974 | Dao | 340/146 |
| 4,122,995 | 10/1978 | Franke | 371/25 |
| 4,570,084 | 2/1986 | Griffin et al. | 307/452 |

OTHER PUBLICATIONS

E. F. Hahn et al, IBM Technical Disclosure Bulletin, vol. 25, No. 2, Jul. 1982, p. 709, "VLSI Testing by On-Chip Error Detection".

Primary Examiner—Charles E. Atkinson
Attorney, Agent, or Firm—Stephen J. Limanek

[57] ABSTRACT

A system for testing a differential logic network is provided which includes a differential exclusive OR circuit having a plurality of inputs for receiving complementary signals from the differential logic network and first and second output terminals and means, e.g., a conventional exclusive OR circuit, for determining the voltage difference between the first and second output terminals to indicate the presence or absence of a fault or error in the differential logic network under test.

12 Claims, 3 Drawing Figures

RANDOM LOGIC ERROR DETECTING SYSTEM FOR DIFFERENTIAL LOGIC NETWORKS

DESCRIPTION

1. Technical Field

This invention relates to logic systems and more particularly to a system for testing differential logic circuits.

2. Background Art

Detecting faulty responses on a system of paired lines each of which should be differential is not easily detected through conventional means of, e.g., shift register latches which are commonly used in level sensitive scan design (LSSD) test systems, since it is difficult and cumbersome to propagate through latches binary 0,0 and 1,1 levels.

Logic systems of a differential type and more specifically of the differential cascode voltage switch type are disclosed in commonly assigned U.S. patent application, Ser. No. 508,454, filed by J. W. Davis and N. G. Thoma on June 27, 1983, now abandoned, and in commonly assigned U.S. patent application, Ser. No. 554,146, filed by W. R. Griffin and L. G. Heller on Nov. 21, 1983, now U.S. Pat. No. 4,570,084 issued 2/11/86.

Systems for testing logic circuits have been disclosed in, e.g., commonly assigned U.S. Pat. No 3,636,443, filed on Oct. 29, 1970, by S. Singh and V. P. Singh, wherein a suitable reference chip or module is identified from a plurality of untested chips and then used as a standard for comparison against chips under test. The outputs from a reference module, derived from a majority logic gate, and from a chip under test are fed into an exclusive OR circuit.

IBM Technical Disclosure Bulletin, Vol. 25, No. 2, July, 1982, page 709, in an article "VLSI Testing by On-Chip Error Detection", by E. F. Hahn and C. J. Starsiak, discloses a testing system wherein output data from a tested combinational logic circuit is fed into a first latch and expected data is fed into a second latch with the output from the latches being connected to the input of an exclusive OR circuit.

U.S. Pat. No. 3,838,393, filed Dec. 17, 1973, by T. T. Dao, discloses a threshold logic gate for parity checking by providing two double threshold detectors.

U.S. Pat. No. 3,803,568, filed Apr. 6, 1973, by C. S. Higashide, discloses the use of an exclusive OR circuit to detect a fault in a main system clock and then to substitute a standby system clock.

U.S. Pat. No. 4,122,995, filed Aug. 2, 1977, by R. H. Franke, discloses a testing system wherein a unit under test and a standard unit have outputs which are applied to an exclusive OR not ($\overline{XOR}$) circuit in a skew analyzer.

DISCLOSURES OF THE INVENTION

It is an object of this invention to provide a test circuit for testing a differential logic system which is simple, fast and effective.

In accordance with the teachings of this invention, an error detecting system is provided which includes a differential exclusive OR logic circuit for independently propagating simultaneously first and second complementary signals representative of binary 0 or 1 data to first and second output terminals during a first period of time and for independently propagating simultaneously first and second like signals to the first and second terminals during a second period of time, a conventional exclusive OR circuit having first and second inputs connected to the first and second terminals, respectively, and having first and second output states, and means for determining the first and second output states during the first and second periods of time to identify logic circuit errors.

The foregoing and other objects, features and advantages of the invention will be apparent from the following and more particular description of the preferred embodiments of the invention, as illustrated in the accompanying drawings.

BEST MODE FOR CARRYING OUT THE INVENTION

Figure 1:
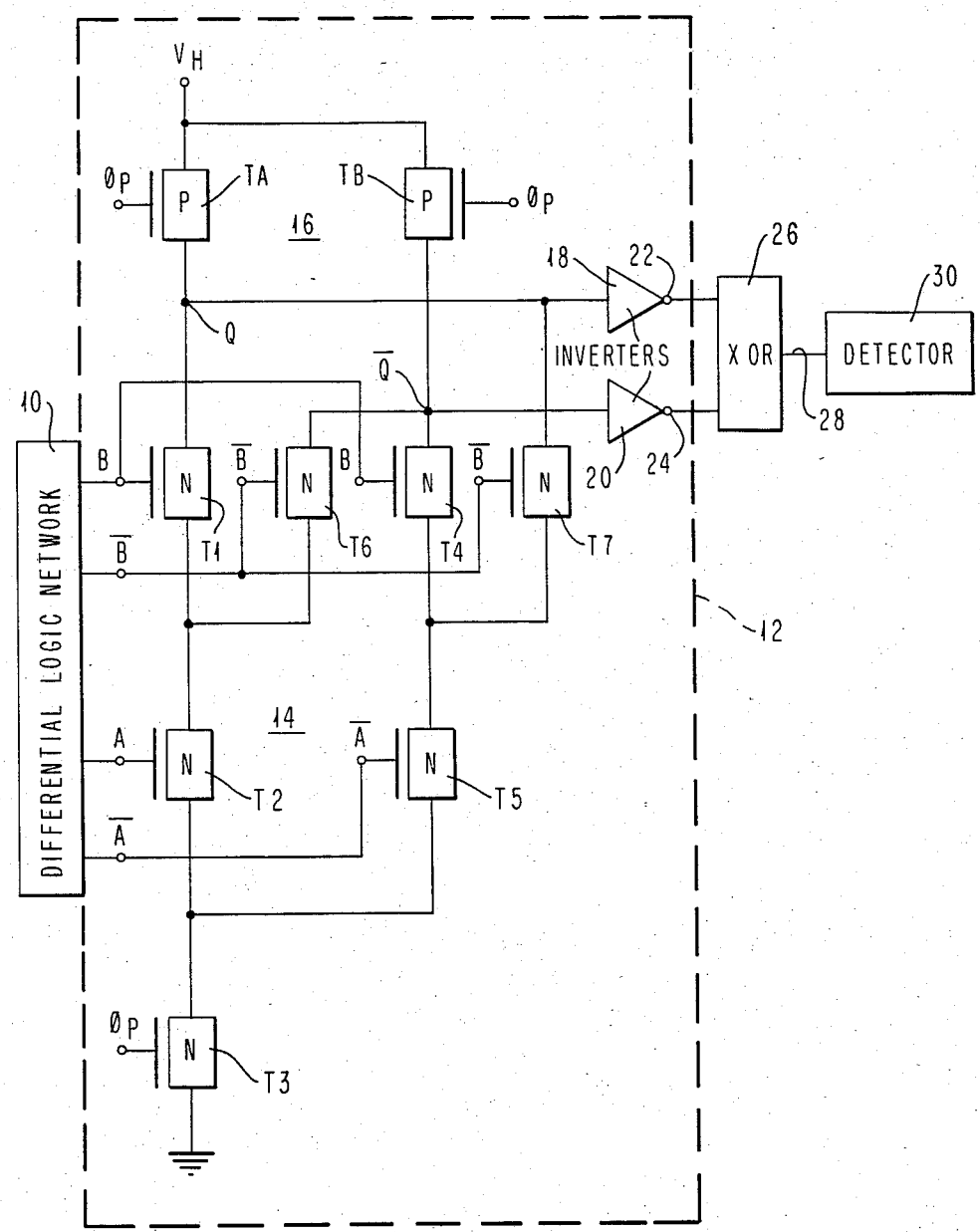
FIG. 1 illustrates a system of the present invention for testing a differential logic network having two differential or complementary pairs of output signals applied thereto.

Referring to the drawings in more detail, there is illustrated in FIG. 1 a system of the present invention for testing a combinational differential logic network 10, e.g., of the cascode voltage switch type, having two differential pairs of output signals A,$\overline{A}$ and B,$\overline{B}$. The system includes a differential exclusive OR circuit 12, e.g., of the clocked differential cascode voltage switch logic circuit type having a combinational logic circuit 14, a load circuit 16 and first and second inverters 18 and 20. The combinational logic circuit 14 has first and second output nodes Q and $\overline{Q}$ with the load circuit 16 being connected between a voltage supply terminal $V_H$, preferably at +5 volts, and nodes Q and $\overline{Q}$. The first inverter 18 has an output 22 and an input connected to node Q. The second inverter 20 has an output 24 and an input connected to node $\overline{Q}$.

The combinational logic circuit 14 includes first, second and third N channel field effect transistors T1, T2 and T3 connected serially between node Q and a point of reference potential, such as ground, with transistor T2 being disposed between transistors T1 and T3. The combinational logic circuit 14 also includes fourth and fifth N channel transistors T4 and T5 connected serially between node $\overline{Q}$ and the common point between transistors T2 and T3. A sixth N channel transistor T6 is connected between node $\overline{Q}$ and the common point between transistors T1 and T2 and a seventh N channel transistor T7 is connected between node Q and the common point between transistors T4 and T5. Transistor T3 has its gate electrode connected to an input terminal $\phi_P$, transistors T2 and T5 have gate electrodes connected to terminals A and $\overline{A}$, respectively, transistors T1 and T4 each have a gate electrode connected to a terminal B and transistors T6 and T7 each have a gate electrode connected to terminal $\overline{B}$.

The load circuit 16 includes a first P channel field effect transistor TA connected between node Q and the voltage supply terminal $V_H$ and a second P channel field effect transistor TB connected between node $\overline{Q}$ and the voltage supply terminal $V_H$.

Each of the inverters 18 and 20 may be a standard complementary metal oxide semiconductor (CMOS) inverter having serially arranged P channel and N channel transistors with their gate electrodes connected together and serving as the input, with the output being taken from the common point between the P channel and N channel transistors.

The system of FIG. 1 also has an exclusive OR circuit 26, preferably not of the differential type, having inputs connected to the outputs 22 and 24 of the inverters 18 and 20, respectively, with an output connected to terminal 28. The exclusive OR circuit 26 may be of any conventional type but preferably made in the CMOS technology. A detector 30 is connected to terminal 28. Detector 30 may also be of any conventional type but preferably capable of distinguishing between two different voltage levels.

In the operation of the system of FIG. 1, nodes Q and $\overline{Q}$ are charged to +5 volts by turning on P channel transistors TA and TB when zero volts are applied to terminal $\phi_P$, with N channel transistor T3 being off. First complementary logic signals are applied to terminals A and $\overline{A}$ and second complementary logic signals are applied to terminals B and $\overline{B}$ from the differential logic network 10. As is known in logic technology, when the complementary logic signals are applied to terminals A, $\overline{A}$, B and $\overline{B}$, a conductive path will normally be produced between node Q and ground or between node $\overline{Q}$ and ground with the voltage at terminal $\phi_P$ raised to at least a voltage equal to the threshold voltage of N channel transistor T3, which voltage turns off P channel transistors TA and TB. Assuming that the voltage at terminals B and $\overline{A}$ is high, transistors T4 and T5 turn on and node $\overline{Q}$ is discharged to ground. Thus, node Q is high and node $\overline{Q}$ is low. When these voltages are applied to the input of the exclusive OR circuit 26 through inverters 18 and 20, a high voltage appears at the output of the exclusive OR circuit 26, i.e., at terminal 28, which is detected by detector 30 to indicate normal operation in the logic network 10. However, if an alpha-particle or other noise or fault mechanism causes, e.g., transistor T2 to turn on, node Q would also be discharged. Thus, in this situation both nodes Q and $\overline{Q}$ are low and, therefore, the voltages at both outputs 22 and 24 are high producing a low or zero voltage output at terminal 28 which is detected by detector 30.

It can be readily seen that by simply applying the outputs from the differential exclusive OR circuit 12 to any standard exclusive OR circuit, a voltage level detector 30 can be used to determine a fault in the logic network 10. It should be noted that the logic circuit 12 used in FIG. 1 of the drawing is an exclusive OR circuit having two differential input pairs A,$\overline{A}$ and B,$\overline{B}$. However, any exclusive OR circuit having differential inputs and a pair of differential outputs may be substituted for the exclusive OR network 12. Furthermore, it should be understood that inverters 18 and 20 are provided primarily as buffer circuits and, if desired, may be eliminated from the system of the present invention.

Figure 2:
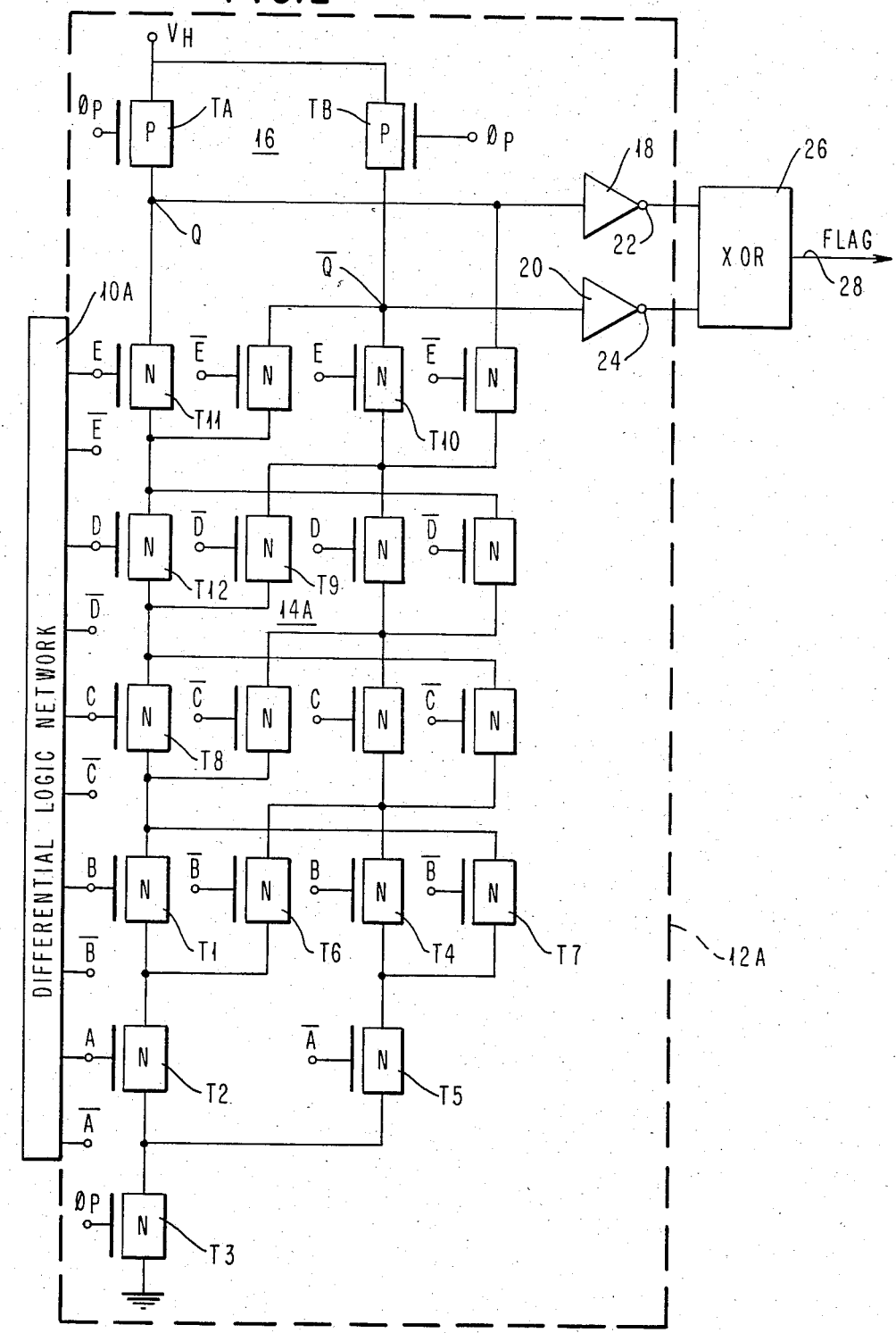
FIG. 2 illustrates a system of the present invention for testing a differential logic network having five differential or complementary pairs of output signals.

FIG. 2 of the drawings illustrates a system of the present invention of the CMOS type shown in FIG. 1 for testing a differential logic network 10A with an exclusive OR circuit 12A including load circuit 16 and a combinational logic circuit 14A made of N channel transistors which has five differential inputs A, B, C, D and E, wherein similar elements have the same reference characters as found in FIG. 1. This exclusive OR circuit 12A may be expressed by a Boolean function which includes the term A B C $\overline{D}$ E.

By referring to this term, it can be seen that, e.g., if this term has each literal represented by a binary 1, i.e., a high voltage, transistors T2, T1, T8, T9 and T10 in the exclusive OR circuit 12A turn on to provide a discharge path from node $\overline{Q}$ to ground through the enabling N channel transistor T3. Thus, the output terminal 24 of inverter 20 will be high or representative of a 1 binary digit of information. It should be noted that under these conditions there is no conductive path to ground from node Q, thus, node Q remains high and output terminal 22 of inverter 18 is at a low voltage.

Likewise, it should be noted that any of the other terms of the Boolean function will produce a 1 binary digit, or high voltage, at output terminal 24 when each of their literals is represented by a 1 binary digit or a high voltage, with output terminal 22 being low. Thus, a flag is not produced at the output terminal 28 of the system when the network 10A is operating properly. However, it can be seen that if an alpha-particle or other noise or fault mechanism causes, e.g., transistor T12 to turn on, node Q would also be discharged, since transistor T11 is connected to terminal E. Thus, in this situation both nodes Q and $\overline{Q}$ are low and, therefore, a flag at terminal 28 would indicate a fault in logic network 10A. Of course, both nodes Q and $\overline{Q}$ could also remain at a high voltage, or at digit 1, if, e.g., transistor T8 did not turn on. Thus, the flag would also indicate a fault in logic network 10A.

It should be understood that any differential logic circuit, such as NAND or NOR circuits, may be tested provided the circuits under test are designed to have complementary or differential outputs.

Figure 3:
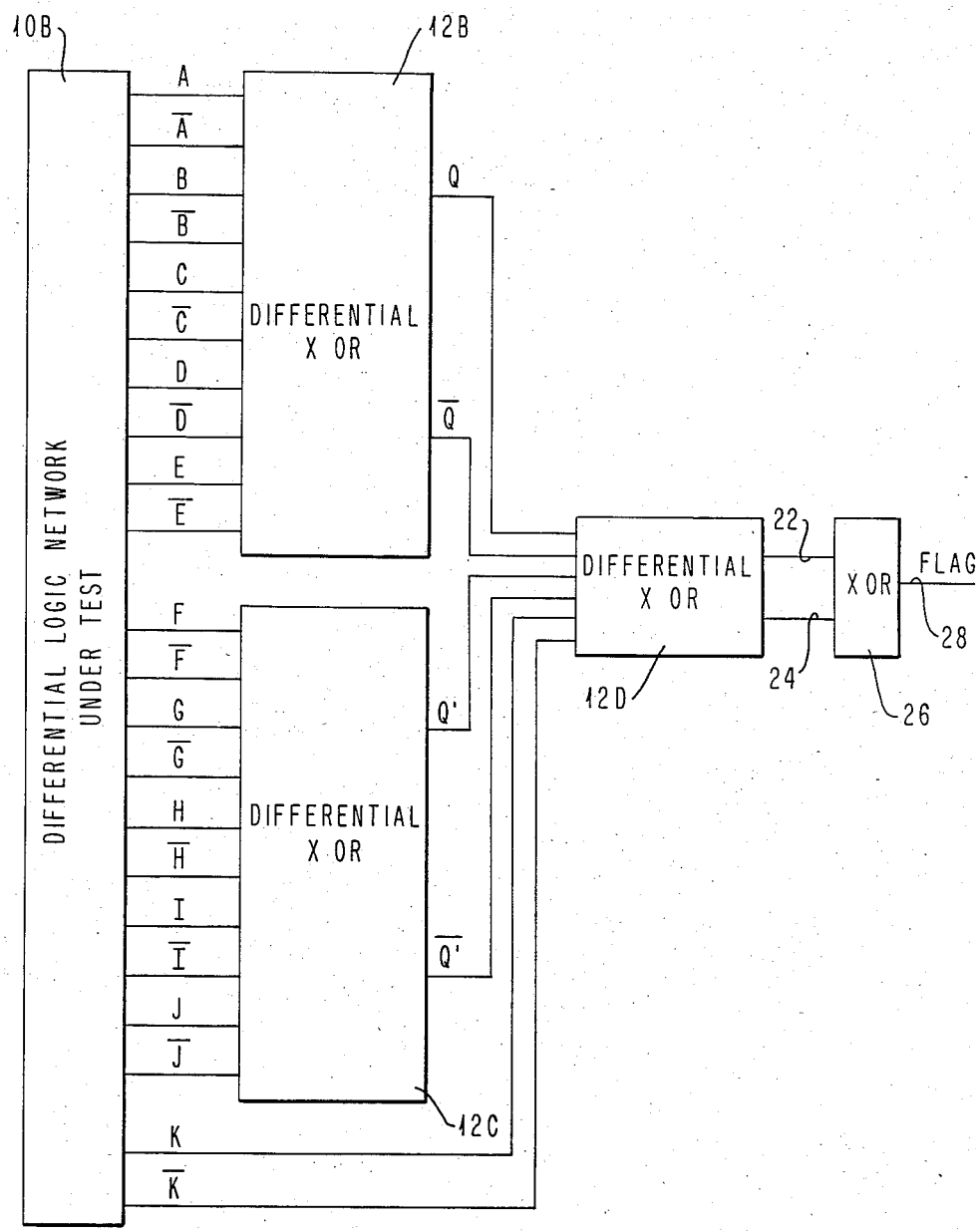
FIG. 3 shows a system of the present invention for simultaneously testing a large number of circuits in a differential logic network having complementary output signals.

In FIG. 3, there is illustrated a system of the present invention for testing a large number of circuits in a differential logic network 10B by using a plurality of differential exclusive OR circuits 12B, 12C and 12D. The system of FIG. 3 tests the circuits of the differential logic network 10B which have logic signals at A,$\overline{A}$ through K,$\overline{K}$. A first of the plurality of differential exclusive OR circuits 12B has signals at A,$\overline{A}$ through E,$\overline{E}$ applied to its input and a second of the plurality of differential exclusive OR circuits 12C has signals at F,$\overline{F}$ through J,$\overline{J}$ applied to its input. A third of the plurality of differential exclusive OR circuits 12D has signals Q,$\overline{Q}$ and signals Q',$\overline{Q}'$ applied to its input from the outputs of the first and second differential exclusive OR circuits 12B and 12C. Also, connected to the input of the third exclusive OR circuit 12D are complementary logic signals K,$\overline{K}$ which are fed directly from the logic network 10B. Thus, it can be seen that each of the first and second exclusive OR circuits 12B and 12C are five high logic circuits, whereas the third exclusive OR circuit is only three high. The output from the third differential exclusive OR circuit is fed into the conventional exclusive OR circuit 26, such as that disclosed in FIGS. 1 and 2 of the drawings.

The system of FIG. 3 operates much in the same manner as the systems illustrated in FIGS. 1 and 2 of the drawings. As can be readily understood, if any of the pairs of logic signals, such as A,$\overline{A}$, feeding into circuit 12B, are similar rather than complementary, both outputs Q and $\overline{Q}$ will be either high or low and, therefore, both output terminals 22 and 24 will be either high or low with flag 28 indicating a fault. Likewise, if any of the pairs of logic signals, such as H,$\overline{H}$, feeding into circuit 12C are similar rather than complementary, both outputs Q' and $\overline{Q}'$ will be either high or low and, therefore, both output terminals 22 and 24 will be either high or low with flag 28 indicating a fault. Of course, if logic signals at K,$\overline{K}$ are similar flag 28 will also indicate a fault or error in the network under test 10B.

It should be noted that a test system has been provided for differential logic circuits in accordance with the teachings of this invention which is very simple, fast and effective and which can test any number of logic circuits in a differential logic network. Although systems have been described using the CMOS technology, it should be understood that, if desired, the test system of the present invention may be made entirely with N channel field effect transistors, or even with bipolar transistors.

While the invention has been particularly shown and described with reference to preferred embodiments thereof, it will be understood by those skilled in the art that various changes in form and details may be made therein without departing from the spirit and scope of the invention.

What is claimed is:

1. A system comprising
   a differential logic network having a plurality of complementary pairs of output terminals,
   a differential exclusive OR circuit having inputs for receiving signals from the output terminals of said logic network and first and second output terminals,
   a second exclusive OR circuit having first and second input terminals coupled to the first and second output terminals of said differential exclusive OR circuit and having a single output terminal with first and second output states, and
   means connected to said single output terminal for detecting said output states.

2. A system as set forth in claim 1 further including first and second inverters disposed between said first and second output terminals and said second exclusive OR circuit.

3. An error detecting system comprising
   differential exclusive OR logic circuit means for independently propagating simultaneously first and second complementary signals representative of binary 0 or 1 data during a first period of time and independently propagating simultaneously first and second like signals during a second period of time to first and second terminals,
   a second exclusive OR circuit having first and second inputs connected to said first and second terminals, respectively, and having first and second output states, and
   means for determining said output states during said first and second periods of time.

4. An error detecting system as set forth in claim 3 wherein said differential exclusive logic circuit means includes a load circuit having first and second P channel transistors connected to said first and second terminals, respectively, a combinational logic circuit and an N channel gating transistor, said combinational logic circuit being connected between said gating transistor and said first and second terminals.

5. An error detecting system as set forth in claim 3 further including first and second inverters wherein said first terminal is connected to the first input of said second exclusive OR circuit through said first inverter and said second terminal is connected to the second input of said second exclusive OR circuit through said second inverter.

6. An error detecting system as set forth in claim 5 wherein said differential exclusive OR logic circuit means includes both N channel and P channel field effect transistors.

7. An error detecting system comprising
   first, second and third transistors, said first and second transistors being connected in parallel with each other and serially with said third transistor,
   fourth, fifth and sixth transistors, said fourth and fifth transistors being connected in parallel with each other and serially with said sixth transistor, said third and sixth transistors being connected in parallel with each other,
   a seventh transistor connected serially with said third and sixth transistors,
   a differential logic network having a plurality of complementary pairs of output terminals connected to control electrodes of said first, second, third, fourth, fifth and sixth transistors,
   first and second nodes, said first and fifth transistors being coupled to said first node and said second and fourth transistors being coupled to said second node,
   an exclusive OR circuit having first and second inputs and an output, said first node being coupled to said first input and said second node being coupled to said second input, and
   means connected to the output of said exclusive OR circuit for determining the output state thereof.

8. An error detecting system as set forth in claim 7 wherein said differential logic network includes means for producing first and second signals of a first pair and first and second signals of a second pair, said first signal of said first pair being applied to the control electrode of said third transistor, said second signal of said first pair being applied to the control electrode of said sixth transistor, said first signal of said second pair being applied to the control electrodes of said first and fourth transistors and said second signal of said second pair being applied to the control electrodes of said second and fifth transistors.

9. An error detecting system as set forth in claim 8 wherein said transistors are N channel transistors and further including a load circuit having first and second P channel transistors and a voltage supply terminal, said first P channel transistor being connected between said first node and said voltage supply terminal and said second P channel transistor being connected between said second node and said voltage supply terminal.

10. An error detecting system as set forth in claim 9 further including means for substantially simultaneously turning on said first and second P channel transistors to charge said first and second nodes and turning off said seventh transistor during a first period of time and for substantially simultaneously turning on said seventh transistor and turning off said first and second P channel transistors during a second period of time.

11. A system comprising
    a differential logic network having a plurality of pairs of output terminals,
    first and second differential exclusive OR circuits, said first differential exclusive OR circuit having inputs coupled to a first number of said plurality of pairs of said output terminals and said second differential exclusive OR circuit having inputs coupled to a second number of said plurality of pairs of said output terminals, a third differential exclusive OR circuit having inputs coupled to the outputs of said first and second differential exclusive OR circuits, a fourth exclusive OR circuit having its input coupled to the output of said third exclusive OR circuit and having a single output terminal with first and second output states, and means connected to said single output terminal for determining the output state of said fourth exclusive OR circuit.

12. A system as set forth in claim 11 further including means for coupling a third number of said plurality of pairs of said output terminals of said differential logic network to the input of said third differential exclusive OR circuit.

* * * * *